G. W. MARCHANT.
Ditching-Machines.

No. 156,807. Patented Nov. 10, 1874.

UNITED STATES PATENT OFFICE.

GEORGE W. MARCHANT, OF HENRY, ILLINOIS.

IMPROVEMENT IN DITCHING-MACHINES.

Specification forming part of Letters Patent No. 156,807, dated November 10, 1874; application filed April 9, 1874.

*To all whom it may concern:*

Be it known that I, GEORGE W. MARCHANT, of Henry, in the county of Marshall and in the State of Illinois, have invented an Improvement in Machines for Tile and Open Ditching; and do hereby declare that the following is a full, clear, and exact description thereof, reference being had to the annexed drawings making a part of this specification, in which like letters of reference refer to like parts, and in which—

Figure 1:
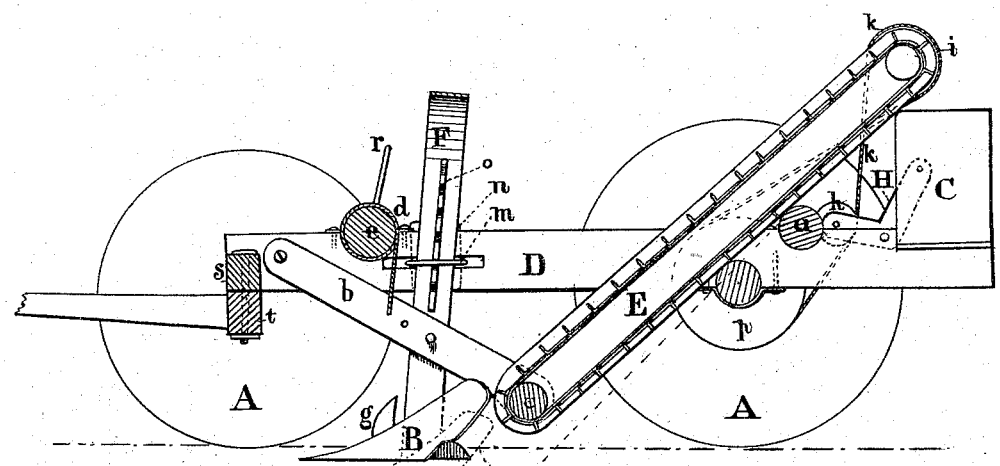
Figure 2:
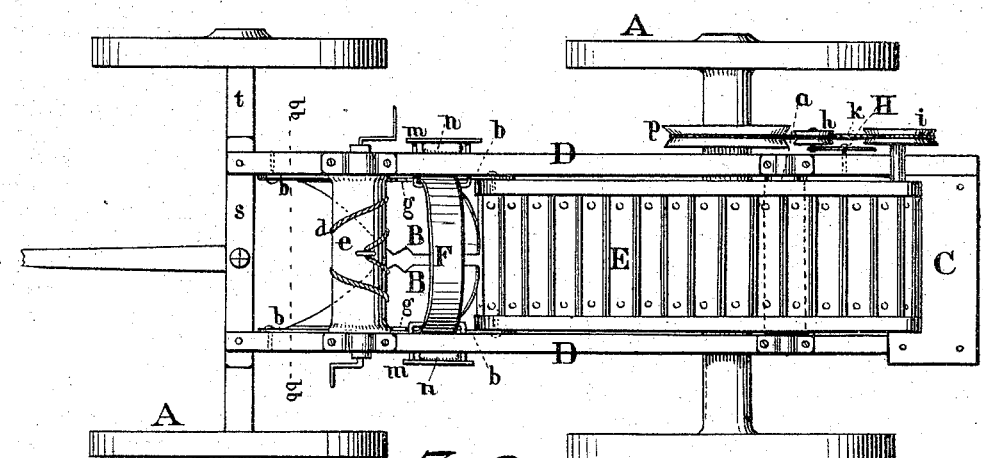
Figure 3:
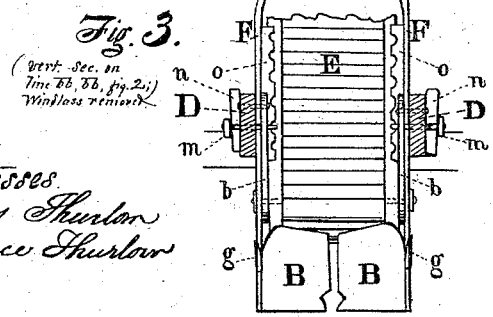

Figure 1 represents a longitudinal vertical section of the machine through its center; Fig. 2, a superficial or plan view of the same; Fig. 3, a vertical cross-section on dotted line *b b b b*, Fig. 2, windlass omitted for the sake of clearness.

This invention relates to a ditching-machine having the plows and elevator adjusted vertically to a higher or lower level, as well as laterally, by means of oblique pivotal bars and notched uprights, in combination with clevises arranged in slots of the frame-bars and wedges, as will be hereinafter more fully explained.

A represents the wheels; B, the plows; C, the inclined lateral discharge-spout; D, horizontal frame; E, the elevator, which is inclined and rests upon a friction-roller, *a*, having bearings in either side of frame, its lower end being pivoted to the rear ends of two parallel inclined bars, *b b*, adjustable to the front of the frame D by screws. These bars *b b* are raised or lowered by a chain or rope, *d*, on a windlass, *e*, placed across the frame. To the center of each bar is attached the uprights F F, which are united by an arch at the top. The lower ends of each upright are, respectively, attached firmly to one of the plow-standards. The plows B B are each about six inches across, or half the width of the elevator, and so arranged as to throw soil to the center of ditch and elevator in the rear. From each mold-board rises a cutter or vertical colter, *g*, for the purpose of cutting the sides of the ditch cleanly and smoothly. H represents a double-armed lever, carrying a pulley, *h*, and attached to the frame between the driving-wheel and the elevator-pulley *i*, for tightening the slack of the elevator-band *k*, which runs around pulley *i*, and that one, *p*, on the supporting-wheel, and crossed between them, to reverse the motion of the elevator. The uprights F are sustained by clevises *m m*, which, respectively, pass through slots in the frame D around each upright, and are wedged tightly behind by the wedges *n n*.

The operation of this machine is as follows: The right and left plows make a clear clean furrow or ditch, well calculated for the laying therein of tile, throwing the soil to the center upon the elevator. The plows and elevator are jointly adjusted to a higher or lower level simultaneously by the bars *b b*, windlass *e*, and uprights F F, and sustained in position by the clevises *m m* and wedges *n* at the horizontal slots in the frame. The soil is discharged to the side of the ditch by the spout C.

What I claim as my invention is—

The plows B and elevator E, adjustable vertically to a higher or lower level, as well as laterally, by means of the oblique pivotal bars *b* and notched uprights F, in combination with the clevises *m*, arranged in the slots of the bars D, and wedges *n*, all constructed to operate substantially as set forth.

In testimony that I claim the foregoing ditching-machine, I have hereunto set my hand this 30th day of March, 1874.

GEORGE W. MARCHANT.

Witnesses:
 H. W. WELLS,
 JOHN JONES.